(12) United States Patent
Wood et al.

(10) Patent No.: US 7,753,975 B2
(45) Date of Patent: Jul. 13, 2010

(54) FUEL COMPRESSION SYSTEM WITH INTERNAL REHEAT FOR DEW POINT SUPPRESSION

(75) Inventors: Donald Mark Wood, Huntersville, NC (US); Richard L. Dishman, Jr., Mooresville, NC (US)

(73) Assignee: Ingersoll Rand Energy Systems Corporation, Portsmouth, NH (US)

( * ) Notice: Subject to any disclaimer, the term of this patent is extended or adjusted under 35 U.S.C. 154(b) by 932 days.

(21) Appl. No.: 11/552,182

(22) Filed: Oct. 24, 2006

(65) Prior Publication Data

US 2008/0092517 A1  Apr. 24, 2008

(51) Int. Cl.
 *B01D 50/00* (2006.01)
(52) U.S. Cl. .......................................... 55/315.2; 62/87
(58) Field of Classification Search ..................... 62/87; 55/315.2
See application file for complete search history.

(56) References Cited

U.S. PATENT DOCUMENTS 5,918,472 A * 7/1999 Jonqueres ...................... 62/87

* cited by examiner

*Primary Examiner*—Robert A Hopkins
(74) *Attorney, Agent, or Firm*—Michael Best & Friedrich LLP

(57) ABSTRACT

A system for conditioning a gas. The system includes a compressor for compressing and heating the gas into a hot gas; an airflow device generating an airflow; and a heat exchanger receiving in a first flow path the hot gas and in a second flow path the airflow. Heat is transferred from the hot gas to the airflow to generate a cool gas and hot airflow, and moisture condenses within the cool gas. A moisture separator separates condensed moisture from the cool gas to generate a saturated gas. A reheater receives in one flow path the saturated gas from the moisture separator and in another flow path the hot airflow from the heat exchanger. Heat is transferred in the reheater from the hot airflow to the saturated gas to generate a superheated gas having a temperature above the saturation temperature of the gas.

15 Claims, 2 Drawing Sheets

FUEL COMPRESSION SYSTEM WITH INTERNAL REHEAT FOR DEW POINT SUPPRESSION

BACKGROUND

The present invention relates to a fuel compression system with internal reheat for dew point suppression.

SUMMARY

In one embodiment, the invention provides a system for conditioning a gas. The system includes a compressor for compressing and heating the gas into a hot gas; an airflow device generating an airflow; and a heat exchanger receiving in a first flow path the hot gas and in a second flow path the airflow. Heat is transferred from the hot gas to the airflow to generate a cool gas and hot airflow, and moisture condenses within the cool gas. A moisture separator separates condensed moisture from the cool gas to generate a saturated gas. A reheater receives in one flow path the saturated gas from the moisture separator and in another flow path the hot airflow from the heat exchanger. Heat is transferred in the reheater from the hot airflow to the saturated gas to generate a superheated gas having a temperature above the saturation temperature of the gas.

In some embodiments, the compressor may include an oil-flooded compressor, such that oil mixes with the hot gas. Such embodiments may include a separator for separating the oil from the hot gas, and may also include an oil cooler that exchanges heat from the oil to the airflow.

In another embodiment the invention provides a method for conditioning gas, the method comprising: compressing and heating the gas in a compressor to generate a hot gas; generating an airflow; exchanging heat between the hot gas and the airflow to generate a cool gas and a hot airflow; separating moisture from the cool gas to generate a saturated gas; and reheating the cool gas with the hot airflow to generate a superheated gas.

In another embodiment, the invention provides a microturbine engine for generating electricity. The microturbine engine includes an air compressor, and a combustor that combusts a mixture of gas from a system for conditioning fuel as described above with compressed air from the air compressor. The combustor creates products of combustion. The microturbine engine further includes a power turbine rotating in response to expansion of the products of combustion. The turbine drives rotation of an electricity generator. The microturbine engine further includes a recuperator that exchanges heat from the products of combustion to the compressed air prior to the compressed air entering the combustor.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
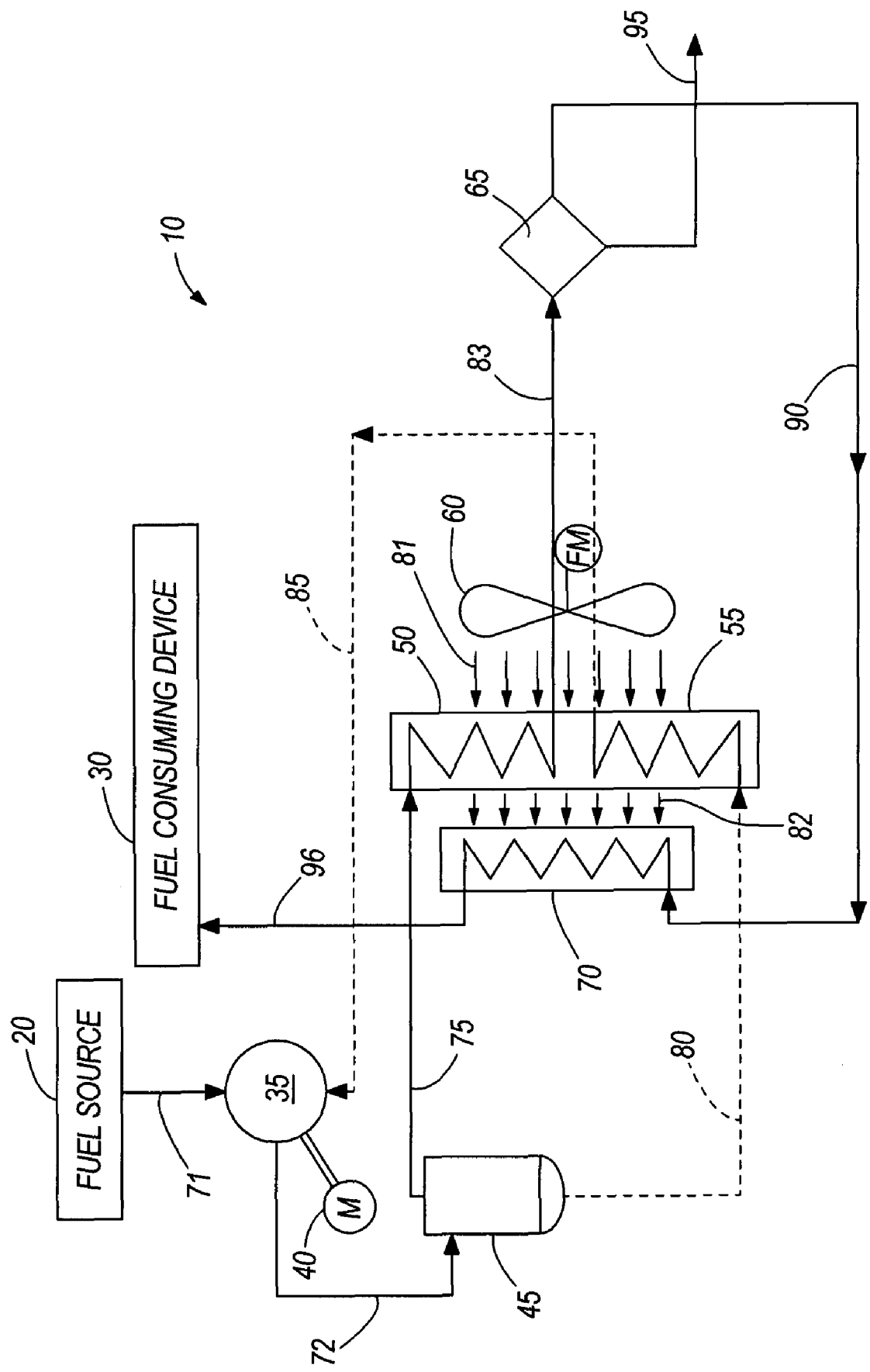
FIG. 1 is a schematic illustration of one embodiment of a fuel compression system of the present invention.

FIG. 1 illustrates a fuel compression/conditioning system 10 that receives wet (i.e., containing water vapor) gas from a fuel source 20, removes condensed water from the gas, and delivers the gas to a fuel consuming device 30. The system 10 includes a compressor 35, a motor 40, a separator tank 45, an aftercooler 50, an oil cooler 55, a blower 60, a moisture separator 65, and a reheater 70.

The fuel source 20 may be, for example, a waste water treatment facility, landfill, or other site from which gas is extracted. The impurities in the gas may be, for example, siloxanes or other contaminants that would cause pollution or damage to a combustion chamber and associated moving parts if not removed from the gas. The fuel consuming device 30 may be, for example, a flare that burns the gas to reduce the amount of unburned hydrocarbons that are released into the environment. Alternatively, the fuel consuming device may be an engine that uses the gas fuel for doing work. Examples of such engines include reciprocating engines, microturbine engines, and larger gas turbine engines. Examples of work done by such engines include production of electricity, driving chillers, refrigerators, or compressors, cogeneration of hot water, and raising, lowering, or otherwise moving objects.

Wet gas flows (at 71) from the fuel source 20 to the compressor 35. The compressor 35 may be, for example, an oil flooded screw compressor and is powered by the motor 40. Gas and oil mix in the compressor 35 while the pressure of the gas increases. The gas and oil become hot during compression. A flow of hot gas and oil flows out of the compressor (at 72) at a temperature of about 220° F. in the illustrated embodiment.

The flow of hot gas and oil then enters the separator tank 45, in which the gas rises to the top and the oil sinks to the bottom. From the separator tank 45, the gas is directed (at 75) to the aftercooler 50 and the oil is directed (at 80) to the oil cooler 55. Each of the aftercooler 50 and oil cooler 55 includes a first flow path for respective hot gas and hot oil. The aftercooler 50 and oil cooler 55 may take the form of any heat exchanger that provides the functionality describe herein, including, for example, counterflow or cross-flow plate-fin heat exchangers and tube-fin heat exchangers.

The blower 60 blows relatively cool ambient air (at 81) through second flow paths in the aftercooler 50 and oil cooler 55 to cool the hot gas and hot oil. In other embodiments, a fan or any other airflow device having the ability to move air across a heat exchanger may be used in place of the blower 60. As a result of heat transfer in the aftercooler 50 and oil cooler 55, the temperature of the air raises and a hot airflow (at 82) is generated. In the illustrated embodiment, the gas temperature drops to about 15° F. above ambient temperature, and the oil temperature drops to about 175° F., but in other embodiments the aftercooler 50 and oil cooler 55 may be sized to achieve other target temperatures. The gas may be termed a cool gas after exiting the aftercooler 50. The cool gas is directed to the moisture separator 65 (at 83) and the oil re-enters the compressor 35 (at 85) to be used again.

The moisture separator 65 removes any water that may have condensed in the cool gas as a result of the drop in gas temperature across the aftercooler 50. Flowing out of the moisture separator 65 is gas that is still at a temperature of about 15° F. above ambient, and is saturated (i.e., the gas is at its dew point). The saturated gas exits the moisture separator 65 (at 90) and enters one flow path in the reheater 70. Also flowing out of the moisture separator 65 (at 95) is water.

The reheater 70 is positioned on the opposite side of the aftercooler 50 and oil cooler 55 from the blower 60 such that the hot airflow 82 (i.e., the air flowing out of the aftercooler 50 and oil cooler 55) flows through another flow path (i.e., a different flow path from the one through which the saturated gas is flowing) in the reheater 70. The reheater 70 may take the form of any heat exchanger that provides the functionality describe herein, including, for example, a counterflow or cross-flow plate-fin heat exchanger and tube-fin heat exchanger. In some embodiments, the reheater 70 may be mounted on the aftercooler 50 and oil cooler 55, but in other embodiments it may be mounted separately.

In the reheater 70, heat is exchanged from the hot airflow to the saturated gas, such that the gas temperature raises above its dew point or saturation temperature. In this regard, the gas may be termed "superheated" upon exiting (at 96) the reheater 70 because its temperature is raised above its saturation temperature. In the illustrated embodiment, the reheater 70 is sized to generate the superheated gas 96 at a temperature of about 40° F. above ambient temperature. This heating causes dew point suppression such that any remaining moisture becomes trapped in the gas and does not condense while the gas is being consumed in the fuel consuming device 30.

Figure 2:
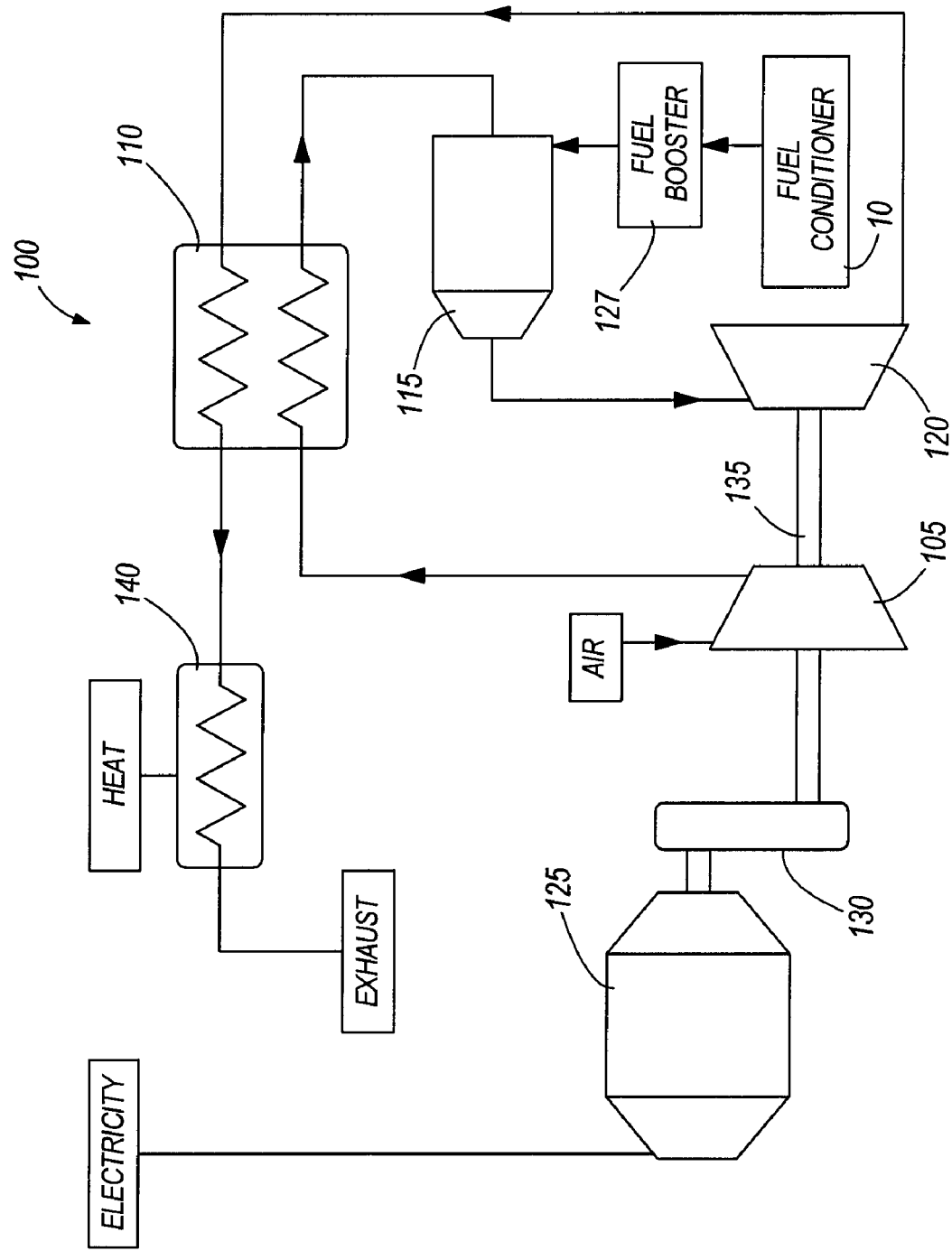
FIG. 2 is a schematic illustration of a microturbine engine generator system for use with the present invention.

FIG. 2 schematically illustrates one type of fuel consuming device that may be used in conjunction with the fuel conditioning system 10 described above. The illustrated fuel consuming device is a microturbine engine generator 100, which is useful in distributed power applications, and can even be mounted on skids and moved between job sites. Microturbine engine generators usually generate 2 MW of power or less, and are therefore relatively small when compared to power generators in power plants that are on the grid.

The illustrated microturbine engine generator 100 includes a compressor 105, a recuperator 110, a combustor 115, a power turbine 120, and an electric power generator 125. Air is compressed in the compressor 105 and delivered to a cool side of the recuperator 110. The recuperator 110 may be, for example, a counterflow plate-fin type heat exchanger. The compressed air is preheated within the recuperator 110 and mixed with a gaseous fuel from a fuel supply (e.g., the superheated gas 96 from the fuel conditioning system 10 described above and illustrated in FIG. 1) to create a combustible mixture.

The combustible mixture is combusted in the combustor 115 to create products of combustion. The products of combustion are then permitted to expand through the power turbine 120 to impart rotational energy to the power turbine 120. Rotation of the power turbine 120 drives operation of the electric generator 125 through an optional gearbox 130 to produce electrical power at a useful frequency. In other embodiments, power electronics may be used in place of the gearbox 130 to condition the electrical signal into a useful frequency. In the illustrated microturbine 100, the power turbine 120 and compressor 105 are coupled for rotation together via a shaft 135, so rotation of the power turbine 120 also drives rotation of the compressor 105. In other embodiments, the power turbine 120 may only drive the power generator 125, and an additional gasifier turbine may be used to drive the compressor 105. In such embodiments, the products of combustion are expanded through both the power turbine 120 and the gasifier turbine.

Prior to exhausting the products of combustion from the microturbine engine 100, they flow into a hot side of the recuperator 110 to preheat the inflowing compressed air. Any remaining heat in the products of combustion is used for some other useful purpose (e.g., heating water) in a final heat exchanger 140 before the products of combustion are exhausted.

Various features and advantages of the invention are set forth in the following claims.

What is claimed is:

1. A system for conditioning a gas, the system comprising:
    a compressor for compressing and heating the gas into a hot gas;
    an airflow device generating an airflow;
    a heat exchanger receiving in a first flow path the hot gas and in a second flow path the airflow, such that heat is transferred from the hot gas to the airflow to generate a cool gas and hot airflow, wherein moisture condenses within the cool gas;
    a moisture separator for separating condensed moisture from the cool gas to generate a saturated gas; and
    a reheater receiving in one flow path the saturated gas from the moisture separator and in another flow path the hot airflow from the heat exchanger, such that heat is transferred from the hot airflow to the saturated gas to generate a superheated gas having a temperature above the saturation temperature of the gas.

2. The system of claim 1, wherein the compressor includes an oil-flooded compressor and wherein the hot gas includes hot oil; the system further comprising a separator adapted to separate the hot oil from the hot gas.

3. The system of claim 2, wherein the heat exchanger includes an aftercooler and an oil cooler; wherein the heat exchanger receives in another flow path the hot oil from the separator; and wherein heat is transferred from the hot oil to the airflow to generate a cool oil and contributing heat to the hot airflow.

4. The system of claim 1, wherein the reheater is mounted on the heat exchanger.

5. The system of claim 1, wherein the airflow device generates an airflow of ambient air.

6. The system of claim 5, wherein the heat exchanger is sized to generate the cool gas at a temperature of about 15.degree. F. above the temperature of the ambient airflow.

7. The system of claim 1, wherein the reheater is sized to generate the superheated gas at a temperature of about 40.degree. F. above ambient temperature.

8. A method for conditioning gas, the method comprising:
    compressing and heating the gas in a compressor to generate a hot gas;
    generating an airflow;
    exchanging heat between the hot gas and the airflow to generate a cool gas and a hot airflow;
    separating moisture from the cool gas to generate a saturated gas; and
    reheating the cool gas with the hot airflow to generate a superheated gas.

9. The method of claim 8, wherein compressing and heating the gas generates a hot gas having a temperature of about 220.degree. F.

10. The method of claim 8, wherein the compressing step is performed with an oil-flooded compressor, such that the hot gas includes hot oil; the method further comprising separating the hot oil from the hot gas prior to the exchanging step.

11. The method of claim 10, wherein the exchanging step includes exchanging heat from both the hot oil and the hot gas to the airflow.

12. The method of claim 8, wherein the exchanging step is performed with a heat exchanger and the reheating step is performed with a reheater, the method further comprising mounting the reheater on the heat exchanger.

13. The method of claim 8, wherein generating an airflow step is performed with a blower, and wherein the airflow is at ambient temperature.

14. The method of claim 13, wherein exchanging step generates the cool gas at a temperature of about 15.degree. F. above the temperature of the ambient airflow.

15. The method of claim 13, wherein the reheating step includes generating the superheated gas at a temperature of about 40.degree. F. above ambient temperature.

* * * * *